(12) United States Patent
Dennis

(10) Patent No.: US 8,136,766 B2
(45) Date of Patent: Mar. 20, 2012

(54) FRANGIBLE FASTENERS FOR AIRCRAFT COMPONENTS AND ASSOCIATED SYSTEMS AND METHODS

(75) Inventor: Brian D. Dennis, White Salmon, WA (US)

(73) Assignee: Insitu, Inc., Bingen, WA (US)

( * ) Notice: Subject to any disclaimer, the term of this patent is extended or adjusted under 35 U.S.C. 154(b) by 1019 days.

(21) Appl. No.: 12/024,861

(22) Filed: Feb. 1, 2008

(65) Prior Publication Data
US 2009/0194638 A1 Aug. 6, 2009

(51) Int. Cl.
*B64C 23/06* (2006.01)
*B64C 1/00* (2006.01)

(52) U.S. Cl. ................... 244/199.4; 244/131

(58) Field of Classification Search .... 244/199.1–199.4, 244/131, 123.1, 123.8; 411/338, 119, 120, 411/116
See application file for complete search history.

(56) References Cited

U.S. PATENT DOCUMENTS

| | | | |
|---|---|---|---|
| 1,749,769 A * | 3/1930 | Johnson ........................ 244/49 |
| 2,211,089 A * | 8/1940 | Berlin ....................... 244/117 R |
| 2,787,185 A * | 4/1957 | Rea et al. ....................... 411/49 |
| 3,411,398 A | 11/1968 | Blakeley |
| 3,512,447 A | 5/1970 | Vaughn |
| 3,657,956 A | 4/1972 | Bradley et al. |
| 4,457,479 A * | 7/1984 | Daude ............................ 244/203 |
| 5,060,888 A * | 10/1991 | Vezain et al. ............... 244/173.3 |
| 5,176,339 A * | 1/1993 | Schmidt .......................... 244/54 |
| 5,222,694 A * | 6/1993 | Smoot ........................... 244/119 |
| 5,407,153 A * | 4/1995 | Kirk et al. ................... 244/199.4 |
| 5,603,592 A | 2/1997 | Sadri et al. |
| 5,762,456 A | 6/1998 | Aasgaard |
| 5,816,761 A | 10/1998 | Cassatt et al. |
| 6,161,797 A * | 12/2000 | Kirk et al. ...................... 244/1 N |
| 7,422,178 B2 * | 9/2008 | DeLaune ....................... 244/132 |
| 7,748,661 B2 * | 7/2010 | Harris et al. ................... 244/131 |
| 2002/0049447 A1 | 4/2002 | Li |
| 2003/0122384 A1 | 7/2003 | Swanson et al. |
| 2006/0091258 A1 | 5/2006 | Chiu et al. |

OTHER PUBLICATIONS

International Search Report and Written Opinion, International Application No. PCT/US09/32720; Applicant: Insitu, Inc., mailed Sep. 29, 2009, 13 pages.

* cited by examiner

*Primary Examiner* — Tien Dinh
(74) *Attorney, Agent, or Firm* — Perkins Coie LLP

(57) ABSTRACT

Frangible fasteners and associated systems and methods are disclosed herein. In one embodiment, for example, an unmanned aircraft can include a fuselage portion, a wing portion, and a winglet carried by the wing portion. The aircraft can also include at least one frangible fastener coupling the winglet to the wing portion. The fastener is coupled to only partially release the winglet from the wing portion when a force on the winglet exceeds a threshold value.

19 Claims, 4 Drawing Sheets

FRANGIBLE FASTENERS FOR AIRCRAFT COMPONENTS AND ASSOCIATED SYSTEMS AND METHODS

TECHNICAL FIELD

The present disclosure relates generally to frangible fasteners and associated systems and methods. Several aspects of the present disclosure, more specifically, are directed toward frangible fasteners for both aircraft and non-aircraft systems.

BACKGROUND

Frangible fasteners are commonly used in unmanned aircraft or air vehicles to secure various components (e.g., fuselage, wings, winglets, empennage, etc.) of the aircraft together. Frangible fasteners can help minimize damage to the aircraft during landing or other high-impact operations. For example, many conventional unmanned aircraft include wings connected to the fuselage with frangible (e.g., plastic) screws. If the aircraft crashes or is subjected to a high-impact load, the plastic screws break, thereby allowing the wings to completely separate from the fuselage. This arrangement often results in less damage to the wings and fuselage as compared to configurations in which the wings are rigidly connected to the fuselage.

One concern with this arrangement, however, is that in many cases it may be undesirable to allow many of the relatively expensive, delicate components of the aircraft to break free from the aircraft during operation. These components can be seriously damaged and/or destroyed after detachment from the aircraft. Another concern with this arrangement is that when such components break completely free from the aircraft, the electrical connections or other system connections between the aircraft and the respective component are completely broken. Repairing these connections can be extremely expensive and time-consuming.

DETAILED DESCRIPTION

A. Overview

The present disclosure describes frangible fasteners and associated systems and methods. An unmanned aircraft in accordance with one embodiment of the disclosure, for example, can include a fuselage portion, a wing portion, and a winglet carried by the wing portion. The aircraft can also include at least one frangible fastener coupling the winglet to the wing portion. The fastener is coupled to only partially release the winglet from the wing portion when a force on the winglet exceeds a threshold value.

An aircraft system in accordance with another embodiment of the disclosure can include an unmanned aircraft having a fuselage and a pair of wings extending from the fuselage. The aircraft system can also include a first and a second component carried by the aircraft and positioned adjacent to each other. The first and second components are coupled together with a frangible link. The frangible link is configured to separate the first component from the second component by a predetermined distance when the frangible link is subjected to a threshold tensile force.

Another aspect of the disclosure is directed to a method for operating an unmanned aircraft. The method can include coupling a first component of the aircraft to a second component of the aircraft with a frangible fastener. The method also includes flying the aircraft and, when a tensile force on the frangible fastener exceeds a threshold value, breaking a portion of the frangible fastener and separating the first component from the second component by a predetermined distance. The first component and the second component remain coupled to each other via the frangible fastener.

Many specific details of certain embodiments of the disclosure are set forth in the following description and in FIGS. 1-5 to provide a thorough understanding of these embodiments. Well-known structures, systems, and methods often associated with such systems have not been shown or described in detail to avoid unnecessarily obscuring the description of the various embodiments of the disclosure. In addition, those of ordinary skill in the relevant art will understand that additional embodiments may be practiced without several of the details described below.

Figure 1:
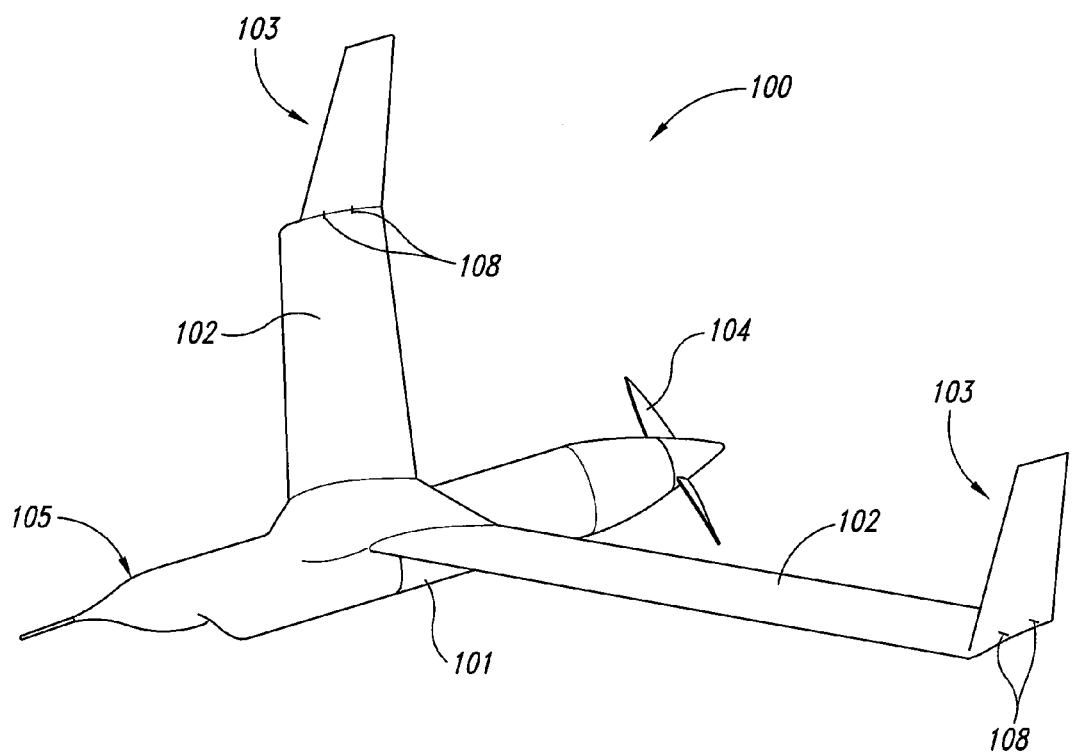
FIG. 1 is a partially schematic, isometric illustration of an unmanned aircraft having one or more components coupled to the aircraft with frangible fasteners or links configured in accordance with an embodiment of the disclosure.

B. Embodiments of Frangible Fasteners for Unmanned Aircraft and Associated Systems and Methods FIG. 1 is a partially schematic, isometric illustration of an unmanned aircraft 100 including one or more components coupled to the aircraft with frangible fasteners or links configured in accordance with an embodiment of the disclosure. The unmanned aircraft 100 can include a fuselage 101, a pair of wings 102 extending outwardly from the fuselage 101, and a propeller 104 positioned at the aft end of the fuselage 101 to propel the aircraft 100 during flight. Each wing 102 can include an upwardly extending winglet 103 for lateral stability and control. In the illustrated embodiment, the winglets 103 are partially removable fixtures releasably coupled to the corresponding wings 102 with one or more frangible fasteners or links 108 (shown schematically). Although each winglet 103 is attached with two frangible fasteners 108, it will be appreciated that a different number of fasteners 108 may be used. Furthermore, the frangible fasteners 108 may be used throughout the aircraft 100 to couple a variety of different components together.

As described in detail below, the frangible fasteners 108 are fasteners that will readily break when a threshold force (i.e., a force above a predetermined level) is applied to the winglet 103 and/or the wing 102. The frangible fasteners 108 in the illustrated embodiment, however, do not completely break. Rather, the frangible fasteners 108 include two discrete members that separate by a specified distance while remaining connected. Compared with conventional frangible fasteners that completely break when subjected to a force, the frangible fasteners 108 are expected to prevent components of the aircraft (e.g., the winglets 103) from breaking completely away from the aircraft 100 and contacting the ground or other structures. In addition, by not completely breaking apart, the frangible fasteners 108 are expected to prevent damage and/or destruction of the electrical (or other system) connections between the wing 102 and the respective winglets 103 if the winglet 103 breaks away from the aircraft 100. Further details regarding the frangible fasteners 108 are described below with reference to FIGS. 2A-5.

Figure 2A:
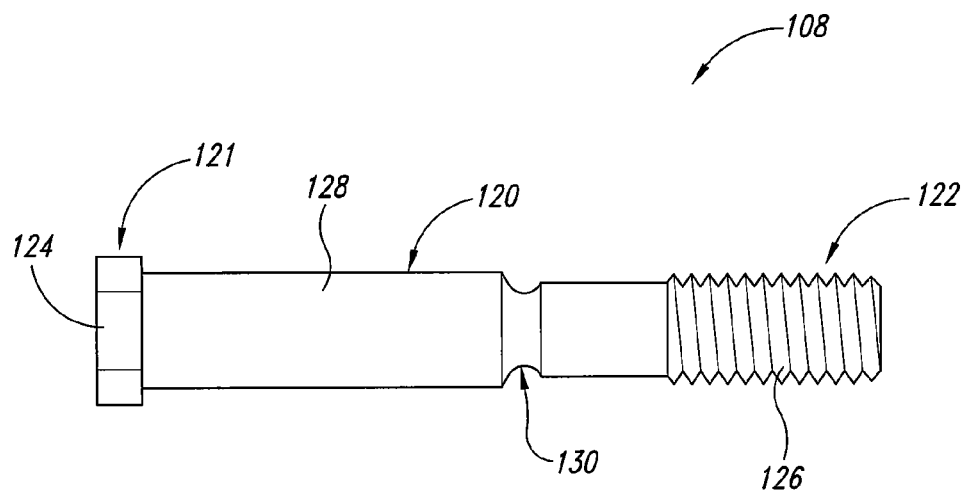
FIG. 2A is an isometric illustration of a frangible fastener configured in accordance with an embodiment of the disclosure.

FIG. 2A is an isometric illustration of a frangible fastener or link 108 before installation with the aircraft 100. The frangible fastener 108 includes a first or outer fastener portion 120 (e.g., an outer screw). As described in greater detail below, the outer fastener portion 120 is a generally hollow housing configured to at least partially surround an inner portion of the fastener. The outer fastener portion 120 includes a head 124 at a first end 121, a plurality of external threads 126 at a second end 122 opposite the first end 121, and a body 128 extending between the first end 121 and the second end 122. In the illustrated embodiment, the head 124 has a hexagonal configuration. In other embodiments, however, the head 124 can have a variety of different configurations. Further, the threads 126 and/or the body 128 can have a different arrangement and include different features.

The outer fastener portion 120 can also include a notch or waist portion 130 between the first and second ends 121 and 122. The notch 130 is a groove that extends completely around the outer fastener portion 120. As described in greater detail below, the notch 130 is positioned at a desired axial location on the outer fastener portion 120 and allows the frangible fastener 108 to break at a predefined point when subjected to a threshold force. In other embodiments, notch 130 may only extend partially around the outer fastener portion 120 and/or the notch 130 may have a different configuration. In still other embodiments, the outer fastener portion 120 may not include a notch 130, and instead include some other feature that defines a predetermined axial location at which the outer fastener portion 120 will break or otherwise fail under a threshold force.

In the illustrated embodiment, the outer fastener portion 120 is composed of aluminum. In other embodiments, however, the outer fastener portion 120 may be composed of a variety of different materials (e.g., metals, plastics, etc.) that break at a predetermined load or force. It should be appreciated that the configuration of the outer fastener portion 120 and the other components of the frangible fastener can vary depending upon the material of which the outer fastener portion 120 is composed. For example, the thickness of the outer fastener portion 120, the axial position of the notch 130, and a number of other features can vary depending upon the material selection.

In one particular aspect of this embodiment, the outer fastener portion 120 can have a form factor generally corresponding to any of a variety of standard fasteners. In this way, a variety of different frangible fasteners 108 having a variety of different form factors can be used throughout various systems of the aircraft 100 (FIG. 1). One advantage of this feature is that the frangible fasteners 108 can be used to replace conventional fasteners in existing aircraft systems without having to retrofit or otherwise modify the aircraft 100.

Figure 2B:
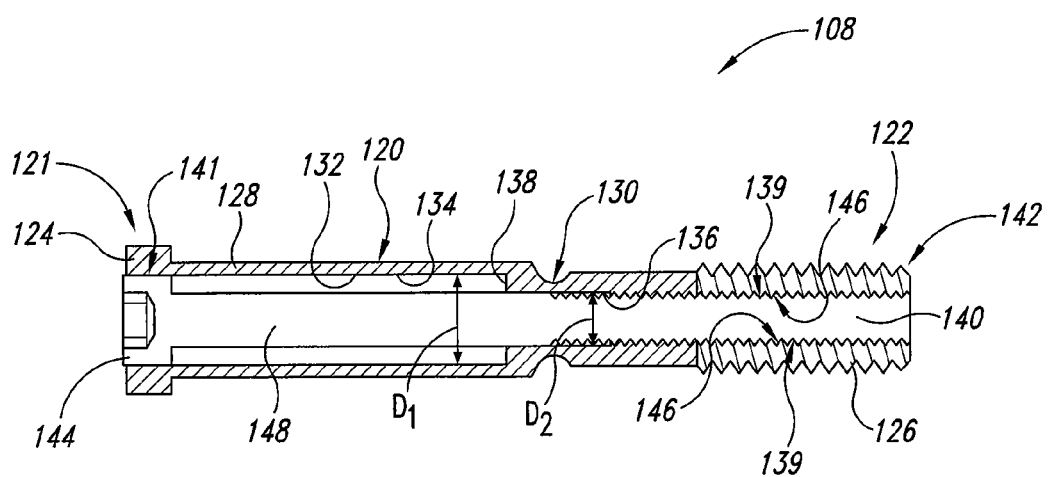
FIG. 2B is a partially schematic, side cross-sectional illustration of the fastener of FIG. 2A.

FIG. 2B is a partially schematic, side cross-sectional illustration of the fastener 108 of FIG. 2A. As best seen in FIG. 2B, the outer fastener portion 120 comprises a generally hollow housing having an opening or via 132 extending therethrough from the first end 121 to the second end 122. The opening 132 includes (a) a first region 134 having a first diameter $D_1$, (b) a second region 136 having a second diameter $D_2$ less than the first diameter $D_1$, and (c) a shoulder or stand-off 138 between the first and second regions 134 and 136 of the opening 132. The outer fastener portion 120 also includes an internal threaded portion 139 proximate to the second end 122. The internal threaded portion 139 is described in more detail below.

The frangible fastener 108 further includes a second or inner fastener portion 140 (e.g., an inner screw). The inner fastener portion 140 can be at least partially received in the opening 132. In the illustrated embodiment, for example, the inner fastener portion 140 is positioned at least approximately completely within the opening 132. In other embodiments, however, a portion of the inner fastener portion 140 may be outside of the opening 132. The inner fastener portion 140 includes a head 144 at a first end 141 of the inner fastener 140, a threaded portion 146 at a second end 142, and a body or shaft 148 extending between the first end 141 and the second end 142. In the illustrated embodiment, the inner fastener portion 140 is composed of steel. In other embodiments, however, the inner fastener portion 140 may be composed a variety of different materials (e.g., metals, plastics, etc.) that have a higher tensile strength than the tensile strength of the outer fastener portion 120.

The head 144 is sized to be slidably received within the first region 134 of the opening 132. Accordingly, the head 144 has a diameter at least approximately less than the diameter $D_1$, but greater than the diameter $D_2$. In the illustrated embodiment, the head 144 includes a socket head configuration. In other embodiments, however, the head 144 can have a different configuration. Further, in still other embodiments the inner fastener portion 140 can have other arrangements and/or include different features.

In one particular aspect of this embodiment, the threaded portion 146 of the inner fastener portion 140 is configured to engage or mate with the corresponding interior threaded portion 139 of the outer fastener portion 120. In this way, the inner fastener portion 140 can be releasably secured to the outer fastener portion 120 before installation of the fastener 108 with the aircraft 100 or other components. Further, as described in detail below with reference to FIG. 3B, the mated threaded portions 139 and 146 help keep the outer fastener portion 120 coupled to the inner fastener portion 140 after the outer fastener portion 120 breaks into two discrete pieces.

In other embodiments, the second end 142 of the inner fastener portion 140 may be releasably secured to the second end 122 of the outer fastener portion 120 using other arrangements in addition to, or in lieu of, the threaded portions 139 and 146. For example, the second end 142 of the inner fastener portion 140 may be coupled to the corresponding region of the outer fastener portion 120 using a pressure-fit arrangement. In still another embodiment, the inner fastener portion 140 may be received within the opening 132 and releasably coupled to the corresponding region of the outer fastener portion 120 using an adhesive material. In any of these embodiments, the inner fastener portion 140 should be coupled to the outer fastener portion 120 in such a way that the joint can withstand a load greater than the threshold force that will break the outer fastener portion 120.

Figure 3A:
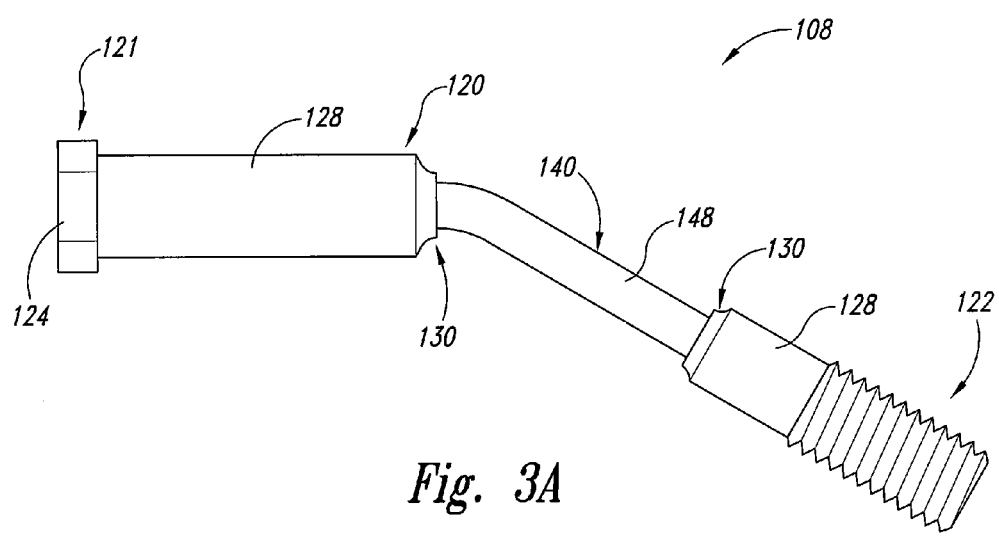
FIG. 3A is an isometric illustration of the fastener of FIG. 2A after being subjected to a threshold force.
Figure 3B:
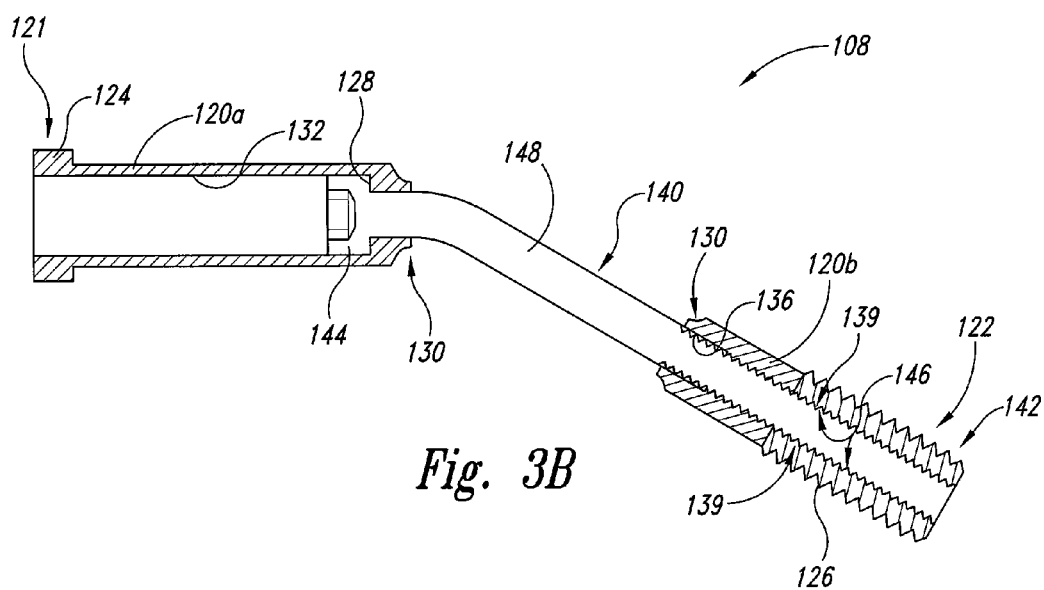
FIG. 3B is a partially schematic, side cross-sectional illustration of the fastener of FIG. 3A.

FIGS. 3A and 3B illustrate the frangible fastener 108 after the fastener has been subjected to a threshold force. More specifically, referring first to FIG. 3A, the outer fastener portion 120 has broken proximate to the notch 130 (and separated into two discrete pieces shown as portions 120a and 120b) and the inner fastener portion 140 has slidably moved relative to the outer fastener portion 120. Although the outer fastener portion 120 has broken into two different pieces, the separate pieces 120a and 120b remain connected via the inner fastener portion 140. In the illustrated embodiment, the applied force has also bent the body 148 of the inner fastener portion 140. In other embodiments, however, the inner fastener portion 140 may or may not bend during operation. The geometry of the various fastener components and the materials of which these components are composed can help determine the breaking strength of the outer fastener portion 120, the length of the separation between the two halves of the outer fastener portion 120, and/or the bending stiffness of the body 148 of the inner fastener portion 140.

FIG. 3B is a partially schematic, side cross-sectional view of the frangible fastener 108 of FIG. 3A. As best seen in FIG. 3B, after the threshold force is applied and the outer fastener portion 120 breaks, the inner fastener portion 140 slidably moves through the opening 132 in the outer fastener portion 120 until the head 144 contacts the shoulder or stand-off portion 138. The shoulder 138 prevents the head 144 from traveling any further relative to the outer fastener portion 120 and helps keep the inner fastener portion 140 coupled to the outer fastener portion 140.

In one particular aspect of this embodiment, the threaded portion 146 remains engaged with the corresponding threaded portion 139 of the outer fastener portion 120b, even after the frangible fastener 108 breaks. In this way, the components (not shown) to which the fastener 108 is coupled do not break completely free from each other. Rather, the components merely separate by a distance corresponding to the length of the inner fastener portion 140, but remain connected to each other. As discussed above, this can help prevent excessive damage to the components and damaging or breaking electrical or other system connections between the components.

Figure 4:
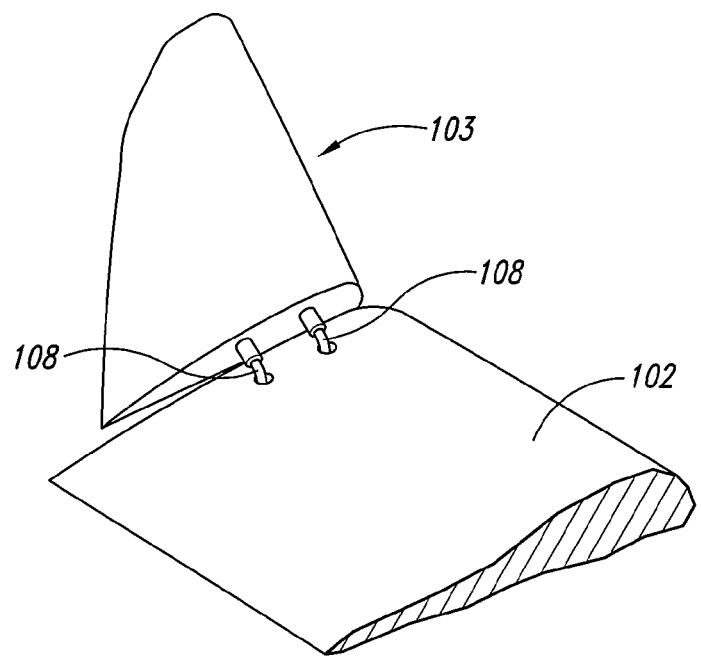
FIG. 4 is a partially schematic, isometric illustration of a portion of the removable fixture and fasteners of FIG. 1 after the fixture has been at least partially disengaged from the wing of the aircraft.

FIG. 4, for example, is a partially schematic, isometric illustration of a portion of the aircraft 100 of FIG. 1 after one of the winglets 103 has been partially disengaged from the wing 102. As shown in FIG. 4, the frangible fasteners 108 allow the winglet 103 to break free from a distal portion of the wing 102, but prevent the winglet 103 from completely disengaging from the wing 102. In addition, because the winglet 103 does not break completely free from the wing 102, the electrical connections 110 (shown schematically in broken lines) between the wing 102 and the winglet 103 do not break. As mentioned above, although the frangible fasteners 108 are only shown here between the wing 102 and the winglet 103, the fasteners 108 may be used with a variety of different components of the aircraft 100.

Figure 5:
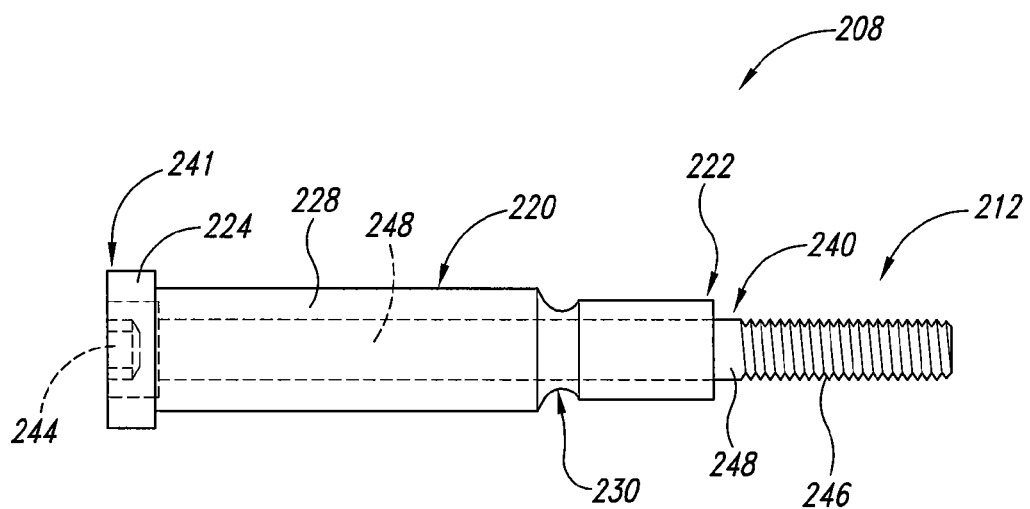
FIG. 5 is a partially schematic, side cross-sectional illustration of a frangible fastener configured in accordance with another embodiment of the disclosure.

C. Additional Embodiments of Frangible Fasteners for Unmanned Aircraft and Associated Systems and Methods FIG. 5 is a partially schematic, side cross-sectional illustration of a frangible fastener or link 208 configured in accordance with another embodiment of the disclosure. The frangible fastener 208 can be used with the aircraft 100 of FIG. 1, or other suitable aircraft or related systems. The frangible fastener 208 can be generally similar to the frangible fastener 108 described above with reference to FIGS. 2A-4. For example, the frangible fastener 208 includes a first or outer fastener portion 220 (e.g., an outer screw) and a second or inner fastener portion 240 (e.g., an inner screw). The frangible fastener 208 differs from the fastener 108 described above in that the outer fastener portion 220 does not completely surround the inner fastener portion 240. Rather, a section of the inner fastener portion 240 is external from the outer fastener portion 220. More specifically, the inner fastener portion 240 includes a head 244 at a first end 241, a plurality of threads 246 at a second end 242, and a body or shaft 248 extending between the first and second ends 241 and 242. The threaded portion 246 and a portion of the body 248 extend from a distal end 222 of the outer fastener portion 220 and are external to the outer fastener portion 220.

In operation, the frangible fastener 208 can function generally similar to the frangible fastener 108 described above. For example, the frangible fastener 208 can be used to couple two discrete components (not shown) together. When the frangible fastener 208 is subjected to a threshold force, the fastener 208 breaks (e.g., at a notched portion 230 of the outer fastener portion 220) and the two halves of the fastener 208 separate from each other. As with the fastener 108 described previously, the inner fastener portion 240 of the fastener 208 can slidably move relative to the outer fastener portion 220, but remains coupled to each component (not shown). In other embodiments, the frangible fastener 208 may have a different configuration and/or include different features. For example, in other embodiments more or less of the inner fastener portion 240 may be external from the outer fastener portion 220.

From the foregoing, it will be appreciated that specific embodiments of the disclosure have been described herein for purposes of illustration, but that various modifications can be made without deviating from the spirit and scope of the disclosure. For example, the frangible fasteners described above with reference to FIGS. 1-5 may have a different configuration and/or include different features. Moreover, specific elements of any of the foregoing embodiments can be combined or substituted for elements in other embodiments. For example, the frangible fasteners described in the context of specific aircraft systems can be implemented in a number of other aircraft or non-aircraft systems that include components releasably coupled together and where threshold loads are an issue (e.g., automotive applications, medical device applications, industrial applications, etc.). In another specific example, the frangible fasteners described herein may be used as a relatively simple and inexpensive force or acceleration sensor. If the outer fastener portion breaks, then the component(s) of the system have been subjected to a force greater than a threshold force. Certain aspects of the disclosure are accordingly not limited to aircraft systems. Furthermore, while advantages associated with certain embodiments of the disclosure have been described in the context of these embodiments, other embodiments may also exhibit such advantages, and not all embodiments need necessarily exhibit such advantages to fall within the scope of the invention. Accordingly, embodiments of the disclosure are not limited except as by the appended claims.

I claim:

1. An unmanned aircraft, comprising:
   a fuselage portion;
   a wing portion;
   a winglet carried by the wing portion; and
   at least one frangible fastener coupling the winglet to the wing portion, wherein the frangible fastener comprises two discrete portions that separate by a selected distance while remaining connected when a force on the wing portion and/or the winglet exceeds a threshold value, and wherein the fastener is configured to only partially release the winglet from the wing portion when the force exceeds the threshold value.

2. The unmanned aircraft of claim 1 wherein the frangible fastener comprises:
   a generally hollow outer portion having an opening extending from a first end of the outer portion to a second end of the outer portion; and
   an inner portion at least partially received in the opening, the inner portion having a head portion proximate to the first end of the outer portion and slidably received within the opening, a threaded portion proximate to and coupled to the second end of the outer portion, and a body extending between the head portion and the threaded portion, wherein the inner portion is configured to move axially relative to the outer portion when the force exceeds the threshold force.

3. The unmanned aircraft of claim 2 wherein:
the opening includes (a) a first region proximate to the first end, (b) a second region proximate to the second end, and (c) a shoulder between the first region and the second region, and wherein the first region has a first diameter and the second region has a second diameter less than the first diameter;
the head of the inner portion has a cross-sectional diameter greater than the second diameter, and wherein the head is slidably received in the first region of the opening between the first end of the outer portion and the shoulder; and
the body of the inner portion is slidably received within at least a portion of both the first and second regions of the opening, and wherein the body has a third diameter less than the second diameter.

4. The unmanned aircraft of claim 2 wherein the inner portion is at least initially completely received in the opening of the outer portion.

5. The unmanned aircraft of claim 2 wherein the inner portion is at least partially external to the opening of the outer portion in an initial configuration.

6. The unmanned aircraft of claim 2 wherein the outer portion further comprises a predefined failure point at an external surface of the outer portion, the failure point defining, at least in part, a desired axial location along the fastener at which the outer portion will break when the force exceeds the threshold value.

7. The unmanned aircraft of claim 6 wherein the failure point comprises a notched portion extending circumferentially around the entire outer portion.

8. The unmanned aircraft of claim 2 wherein:
the outer portion is composed of a first material having a first tensile strength; and
the inner portion is composed of a second material having a second tensile strength greater than the first tensile strength.

9. The unmanned aircraft of claim 8 wherein the first material comprises aluminum and the second material comprises steel.

10. The unmanned aircraft of claim 2 wherein the frangible fastener comprises (a) an initial position before the force exceeds the threshold force and in which the inner portion is completely received within the opening of the outer portion, and (b) an engaged position after the force exceeds the threshold force, and wherein in the engaged position, the outer portion includes two discrete portions out of contact with each other and operably coupled together via the inner portion.

11. The unmanned aircraft of claim 1 wherein the frangible fastener comprises:
a generally hollow outer portion having an opening extending from a first end of the outer portion to a second end of the outer portion; and
an inner portion at least partially received in the opening, the inner portion having a head portion proximate to the first end of the outer portion and slidably received within the opening, a distal portion proximate to and engaged with the second end of the outer portion in a pressure-fit arrangement, and a body extending between the head portion and the distal portion, wherein the inner portion is configured to axially move relative to the outer portion when the force exceeds the threshold force.

12. An aircraft system, comprising:
an unmanned aircraft having a fuselage and a pair of wings extending from the fuselage;
a first component carried by the aircraft;
a second component carried by the aircraft and positioned adjacent to the first component; and
a frangible link for coupling the first component to the second component, wherein the frangible link comprises two discrete members that separate by a predetermined distance while remaining connected when a force on the frangible link exceeds a threshold tensile force, and wherein the frangible link is configured to separate the first component from the second component by no more than the predetermined distance when the frangible link is subjected to the threshold tensile force.

13. The aircraft system of claim 12 wherein:
the frangible link includes an outer housing having an opening extending axially therethrough, and an inner shaft slidably received within the opening;
the outer housing is configured to break into two discrete portions under the threshold tensile force, and wherein one portion of the outer housing remains in contact with the first component and the other portion of the outer housing remains in contact with the second component; and
the inner shaft is configured to slidably move within the opening relative to the outer housing and remain coupled to both of the first and second components after the force on the frangible link exceeds the threshold tensile force.

14. The aircraft system of claim 13 wherein:
the opening extending through the outer housing includes—
a first region proximate to a first end of the outer housing, the first region having a first dimension;
a second region proximate to the second end of the outer housing, the second region having a second dimension less than the first dimension; and
a stand-off between the first region and the second region; and
the inner shaft includes—
a head at the first region of the opening, and wherein the head is configured to slidably move within the opening between the first end and the stand-off after the force exceeds the threshold force; and
a threaded portion mated with a corresponding threaded portion of the outer housing at the second region of the opening, and wherein the threaded portion is configured to remain generally fixed relative to the corresponding threaded portion of the outer housing after the force exceeds the threshold force.

15. The aircraft system of claim 13 wherein:
the outer housing is composed of a first material that breaks at the threshold tensile force; and
the inner shaft is composed of a second material that breaks at a tensile force greater than the threshold tensile force.

16. The aircraft system of claim 13 wherein:
the frangible link includes an outer housing having an opening extending axially therethrough, and an inner shaft slidably received within the opening; and
after the frangible link is subjected to a threshold tensile force, the first and second components separate from each other by a distance less than a length of the inner shaft.

17. The aircraft system of claim 12 wherein the frangible link comprises:
- an outer housing having a via extending axially therethrough and an inner shaft slidably received within the via, and wherein the outer housing includes a first head portion and the inner shaft includes a second head portion completely received within the via;
- the first head portion has a hexagonal head configuration; and
- the second head portion has a socket head configuration.

18. An unmanned aircraft, comprising:
- a fuselage portion;
- a wing portion;
- a winglet carried by the wing portion; and
- at least one frangible fastener coupling the winglet to the wing portion, the frangible fastener being configured to only partially release the winglet from the wing portion when a force on the winglet exceeds a threshold value, and wherein the frangible fastener comprises—
  - a generally hollow outer portion having an opening extending from a first end of the outer portion to a second end of the outer portion; and
  - an inner portion at least partially received in the opening, the inner portion having a head portion proximate to the first end of the outer portion and slidably received within the opening, a threaded portion proximate to and coupled to the second end of the outer portion, and a body extending between the head portion and the threaded portion, wherein the inner portion is configured to move axially relative to the outer portion when the force exceeds the threshold force.

19. An aircraft system, comprising:
- an unmanned aircraft having a fuselage and a pair of wings extending from the fuselage;
- a first component carried by the aircraft;
- a second component carried by the aircraft and positioned adjacent to the first component; and
- a frangible link for coupling the first component to the second component, wherein the frangible link is configured to separate the first component from the second component by no more than a predetermined distance when the frangible link is subjected to a threshold tensile force, wherein the frangible link comprises—
  - an outer housing having an opening extending axially therethrough, and an inner shaft slidably received within the opening,
  - wherein the outer housing is configured to break into two discrete portions under the threshold tensile force, and wherein one portion of the outer housing remains in contact with the first component and the other portion of the outer housing remains in contact with the second component; and
  - wherein the inner shaft is configured to slidably move within the opening relative to the outer housing and remain coupled to both of the first and second components after the force on the frangible link exceeds the threshold tensile force.

* * * * *